US012039798B2

(12) United States Patent
Gao et al.

(10) Patent No.: US 12,039,798 B2
(45) Date of Patent: Jul. 16, 2024

(54) PROCESSING FORMS USING ARTIFICIAL INTELLIGENCE MODELS

(71) Applicant: Salesforce, Inc., San Francisco, CA (US)

(72) Inventors: Mingfei Gao, Sunnyvale, CA (US); Ran Xu, Mountain View, CA (US)

(73) Assignee: Salesforce, Inc., San Francisco, CA (US)

(*) Notice: Subject to any disclaimer, the term of this patent is extended or adjusted under 35 U.S.C. 154(b) by 251 days.

(21) Appl. No.: 17/453,070

(22) Filed: Nov. 1, 2021

(65) Prior Publication Data

US 2023/0133690 A1   May 4, 2023

(51) Int. Cl.
*G06F 40/174* (2020.01)
*G06F 40/205* (2020.01)
*G06N 20/00* (2019.01)
*G06V 30/412* (2022.01)
*G06V 30/19* (2022.01)

(52) U.S. Cl.
CPC .......... *G06V 30/412* (2022.01); *G06F 40/174* (2020.01); *G06F 40/205* (2020.01); *G06N 20/00* (2019.01); *G06V 30/19007* (2022.01)

(58) Field of Classification Search
CPC ...... G06V 20/20; G06V 30/412; G06V 30/10; G06V 30/414; G06V 10/82; G06V 20/00; G06V 30/19007; G06F 3/011; G06F 40/205; G06F 40/174; G10L 21/0364; G06N 20/00
See application file for complete search history.

(56) References Cited

U.S. PATENT DOCUMENTS

| | | | | |
|---|---|---|---|---|
| 10,872,236 | B1* | 12/2020 | Elor | G06V 30/1452 |
| 10,896,357 | B1* | 1/2021 | Corcoran | G06F 18/217 |
| 11,145,123 | B1* | 10/2021 | Chor | G06V 20/20 |
| 11,482,002 | B1* | 10/2022 | Bhushan | G06V 20/20 |
| 2002/0091715 | A1* | 7/2002 | Coady | G06F 16/3344 |
| 2003/0100345 | A1* | 5/2003 | Gum | H04M 1/6016 |
| | | | | 704/E21.009 |
| 2007/0289013 | A1* | 12/2007 | Lim | G06F 21/552 |
| | | | | 726/22 |
| 2011/0167060 | A1* | 7/2011 | Merz | G06F 16/24558 |
| | | | | 707/727 |
| 2014/0355835 | A1* | 12/2014 | Rodriguez-Serrano | ...... |
| | | | | G06V 20/63 |
| | | | | 382/105 |
| 2020/0050638 | A1* | 2/2020 | Hancock | G06F 16/90344 |

(Continued)

*Primary Examiner* — Jakieda R Jackson
(74) *Attorney, Agent, or Firm* — Holland & Hart LLP

(57) ABSTRACT

An application server may receive an input document including a set of input text fields and an input key phrase querying a value for a key-value pair that corresponds to one or more of the set of input text fields. The application server may extract, using an optical character recognition model, a set of character strings and a set of two-dimensional locations of the set of character strings on a layout of the input document. After extraction, the application server may input the extracted set of character strings and the set of two-dimensional locations into a machine learned model that is trained to compute a probability that a character string corresponds to the value for the key-value pair. The application server may then identify the value for the key-value pair corresponding to the input key phrase and may out the identified value.

20 Claims, 11 Drawing Sheets

(56) References Cited

U.S. PATENT DOCUMENTS

| | | | |
|---|---|---|---|
| 2020/0110800 A1* | 4/2020 | Astigarraga | G06F 40/289 |
| 2020/0117944 A1* | 4/2020 | Duta | G06V 30/224 |
| 2020/0364094 A1* | 11/2020 | Kahle | G06F 12/0842 |
| 2021/0027458 A1* | 1/2021 | Chor | G06F 16/5838 |
| 2021/0216448 A1* | 7/2021 | Chen | G06F 3/0679 |
| 2021/0311877 A1* | 10/2021 | Park | G06F 3/0661 |
| 2022/0027434 A1* | 1/2022 | Chen | G06N 20/20 |
| 2022/0067361 A1* | 3/2022 | Hoehne | G06V 30/414 |

\* cited by examiner

| INVOICE | |
|---|---|
| East Repair Inc.<br>1912 Harvest Lane<br>New York, NY 12210 — 402 | |

| BILL TO:<br>John Smith<br>2 Court Square<br>New York, NY 12210 | SHIP TO:<br>John Smith<br>3787 Pineview Drive<br>Cambridge, MA 12210 | INVOICE #   404<br>INVOICE DATE:<br>P.O. #<br>DUE DATE: | US-001   406<br>11/02/2019<br>2312/2019<br>26/02/2019 |
|---|---|---|---|

| QTY | DESCRIPTION | UNIT PRICE | AMOUNT |
|---|---|---|---|
| 1 | Front and rear brake cables | 100.00 | 100.00 |
| 2 | New set of pedal arms | 15.00 | 30.00 |
| 3 | Labor 3hrs | 5.00 | 15.00 |
| | | Subtotal | 145.00 |
| | | Sales Tax 6.25% | 9.06 |
| | | TOTAL | $154.06 |

PROCESSING FORMS USING ARTIFICIAL INTELLIGENCE MODELS

FIELD OF TECHNOLOGY

The present disclosure relates generally to database systems and data processing, and more specifically to processing forms using artificial intelligence models.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Systems may use or otherwise support fillable forms having fields for input data and a variety of formats (e.g., order forms, invoices, etc.). A user may use the cloud platform to query for and extract meaningful information from a fillable form. In some systems, the form may have a specific template and the user may be limited to querying using specific terms or query formats. However, in cases with no predefined templates for reference, it is challenging to automatically extract information of interest from forms. Thus, techniques for extracting information from forms having different formats may be improved.

BRIEF DESCRIPTION OF THE DRAWINGS

FIG. 4 illustrates an example of an input document that supports processing forms using artificial intelligence models in accordance with aspects of the present disclosure.

DETAILED DESCRIPTION

Figure 1:
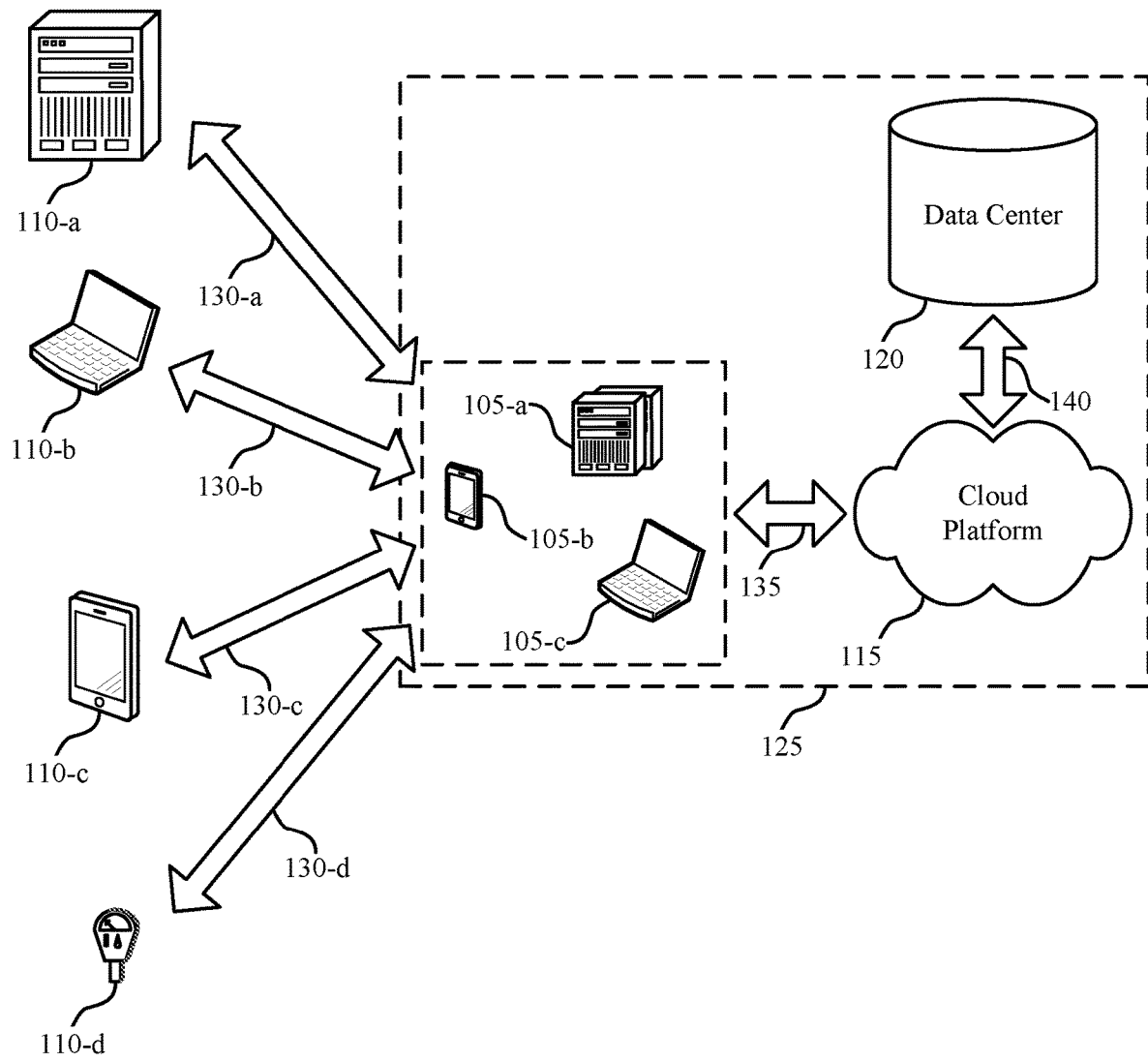
FIG. 1 illustrates an example of a form processing at a server system that supports processing forms using artificial intelligence models in accordance with aspects of the present disclosure.

An organization may store information and data for users (e.g., customers, organizations, etc.) such as data and metadata for exchanges, opportunities, orders, invoices, deals, assets, customer information, and the like. Some data storage and processing systems may receive or store data using forms with fillable fields, and some systems may support a variety of formats of fillable forms (e.g., order forms, invoices, etc.). Forms can be classified into at least two categories in terms of their layout flexibility: fixed forms and non-fixed forms. A fixed form may be defined as a form that has limited structure variations in terms of layouts, texts, and visual appearance. For example, a driver license may be considered a fixed form, since each state has a limited number of designs and formats for its driver license. A non-fixed form may be defined as a form that has a non-fixed structure or is otherwise flexible in terms of its layout and content. For example, an invoice may be considered a non-fixed form as each vendor may have their own design of invoices with different layouts, texts, and visual appearances. Systems may be configured to automatically ingest forms and extract information from them such that the information can be queried, stored, or otherwise processed. However, such systems may require a template or other reference to guide the system in understanding which fields correspond to which types of information. Such systems are thereby limited in their utility if there are no predefined templates for reference or if the system is tasked with ingesting non-fixed forms with varying formats. Therefore, it is challenging to automatically extract information of interest from non-fixed forms using current systems.

Techniques of the present disclosure provide for an automatic system to extract information of interest from fixed forms and non-fixed forms, thus improving the processing efficiency of documents having different formats. The techniques described herein provide for a method of extracting key-value pairs from arbitrary non-fixed forms based on specified requests (e.g., queries) by users. The system, which may include a database system, one or more application servers, a cloud platform, or any combination of computing devices and architectures as described herein, may use an artificial intelligence model (e.g., a machine learned model) applicable to arbitrary types of fixed forms and non-fixed forms. Users may use the artificial intelligence model to extract key-value pairs of interest or infer the value for arbitrary keys specified by users. To retrieve a value corresponding to an input phrase, the system may use an artificial intelligence model in conjunction with an image text extractor (e.g., an optical character recognition model).

The system may receive a user input including an input document (such as a form, a set of forms, etc.) and an input key phrase (e.g., a query). The input document may include a set of input text fields. Upon receiving the input form, the system may extract, using an optical character recognition model (or similar image or text processing model), a set of character strings and a set of two-dimensional locations of the set of character strings on a layout of the input document. For instance, the system may process the input form (e.g., input as an image or text file) to detect and recognize the words [w1, w2, . . . , wM] and their locations in [b1, b2, . . . , bM] in the image. The system may then input the words (in the form of character strings or groups of characters), their corresponding locations, and the input key phrase into an artificial intelligence model (e.g., transformer-based model). The artificial intelligence model may be an example of a machine learned model that is trained to compute a probability, for each character string of the set of character strings, whether that a character string corresponds to the value for the key-value pair corresponding to the input key phrase. In some examples, the system may then generate a probability of each word being a value corresponding to the requested key. In examples where the value includes multiple words, the system may group potential value words into phrases based on the output of the artificial intelligence model and the spatial arrangement of the words. The system may identify the value for the key-value pair corresponding to the input key phrase based on inputting the extracted set of character strings and the set of two-dimensional locations into the machine learned model. In some examples, the system may output the matching value phrase for the input key phrase.

Aspects of the disclosure are initially described in the context of an environment supporting an on-demand database service. Aspects of the disclosure are further described with respect to a general system diagram that shows computing components and data flows that support processing forms using artificial intelligence models, a block diagram illustrating a user interface, and a process flow diagram illustrating various process and dataflows that support the techniques herein. Aspects of the disclosure are further illustrated by and described with reference to apparatus diagrams, system diagrams, and flowcharts that relate to processing forms using artificial intelligence models.

FIG. 1 illustrates an example of a system 100 for cloud computing that supports processing forms using artificial intelligence models in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to some applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The data center 120 may be an example of a multi-tenant system that supports data storage, retrieval, data analytics, and the like for various tenants, such as the cloud clients 105. As such, each cloud client 105 may be provided with a database instance in the datacenter 120, and each database instance may store various datasets that are associated with the particular cloud client 105. More particularly, each cloud client 105 may have a specific set of datasets that are unique for the cloud client 105. The cloud platform and datacenter 120 may support a system that processes a set of datasets for a particular cloud client 105. In some examples, the cloud platform and datacenter 120 support a system that receives an input document and an input key phrase from a particular cloud client 105 and generates a value for the input key phrase based on a machine learned model. In some examples, the input key phrase may be received as a natural language query. As such, the value corresponding to the input key phrase is based on a set of character strings (words or phrases) and a set of two-dimensional locations of the set of character strings on a layout of the input document. That is, the value determination in response to inputting a form may support customer specific analytics by capturing contexts or meanings that are unique to a form type and the cloud client 105.

Forms are common in daily business workflows. A large amount of human effort is needed to process the massive number of form-like documents. Developing an automatic system to extract information of interest from forms may improve the processing efficiency. As described above, a fixed form may be defined as a form that has limited structure variations in terms of layouts, texts, and visual appearance. For example, a driver's license may be considered as a fixed form, since each state has one design (or a limited number of designs) of its driver license. The fixed structure of these forms may be used to utilize some predefined templates to extract information of interest. On the other hand, a non-fixed form may be defined as a form that has non-fixed structures. For example, an invoice may be considered as a non-fixed form given the fact that each vendor will have their own design of invoices with different layouts, texts, and visual appearances. Since there are no predefined templates for reference, it may be challenging to extract information of interest from non-fixed forms.

Some techniques may be utilized to extract information in the form of key-value pairs from non-fixed forms. In some examples, a system may extract all the key-value pairs from the form without considering the interest of users. After that, the users may manually select information from the redundant results. For instance, a system may receive a form as an input, and may identify a mapping between keys and values included in the form. However, there is no way for a user to query a value for a particular key included in the form. In this case, the user may receive a one to one mapping of keys and values, and may have to manually sort through the mapping in order to identify the requested key and determine their corresponding value. In another example, a system may extract key-value pairs of predefined field categories on invoices. However, such techniques for information extraction may work for a pre-fixed set of fields and may be specially designed for invoices and may not be used for other types of non-fixed forms. In some examples, a system may extract values for customized keys. However, such an extraction technique may depend on more information by users (such as the specific key's data type) and may not be able to handle virtual keys and it is limited for key variations. In some examples, virtual keys may be defined as keys that are not included in a document and key variation may occur when an input key is not an exact match with any key included in a document. Thus, the system configured to extract values for customized keys from a document may not be able to handle an input key that is not included in the document.

As described herein, the datacenter 120 and cloud platform 115 may support processing forms using artificial intelligence models using a key text as the input and can handle virtual keys and key variations. For instance, the datacenter 120 and cloud platform 115 may support receiving a query for an input key associated with a document, where the input key is not included in the document. Additionally or alternatively, the datacenter 120 and cloud platform 115 may support receiving a query for an input key associated with a document, where the input key is not an exact match with any key included in the document. In some examples, a system may receive an input document including a set of input text fields and an input key phrase querying a value for a key-value pair that corresponds to one or more of the set of input text fields. The system may use a machine learned model to determine a value for a key-value pair corresponding to the input key phrase. In some examples, the system may input the input key phrase into the machine learned model. The system may then identify a set of probabilities for the set of character strings being the value for the key-value pair corresponding to the input key phrase. The system may then output the identified value corresponding to the input key phrase.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
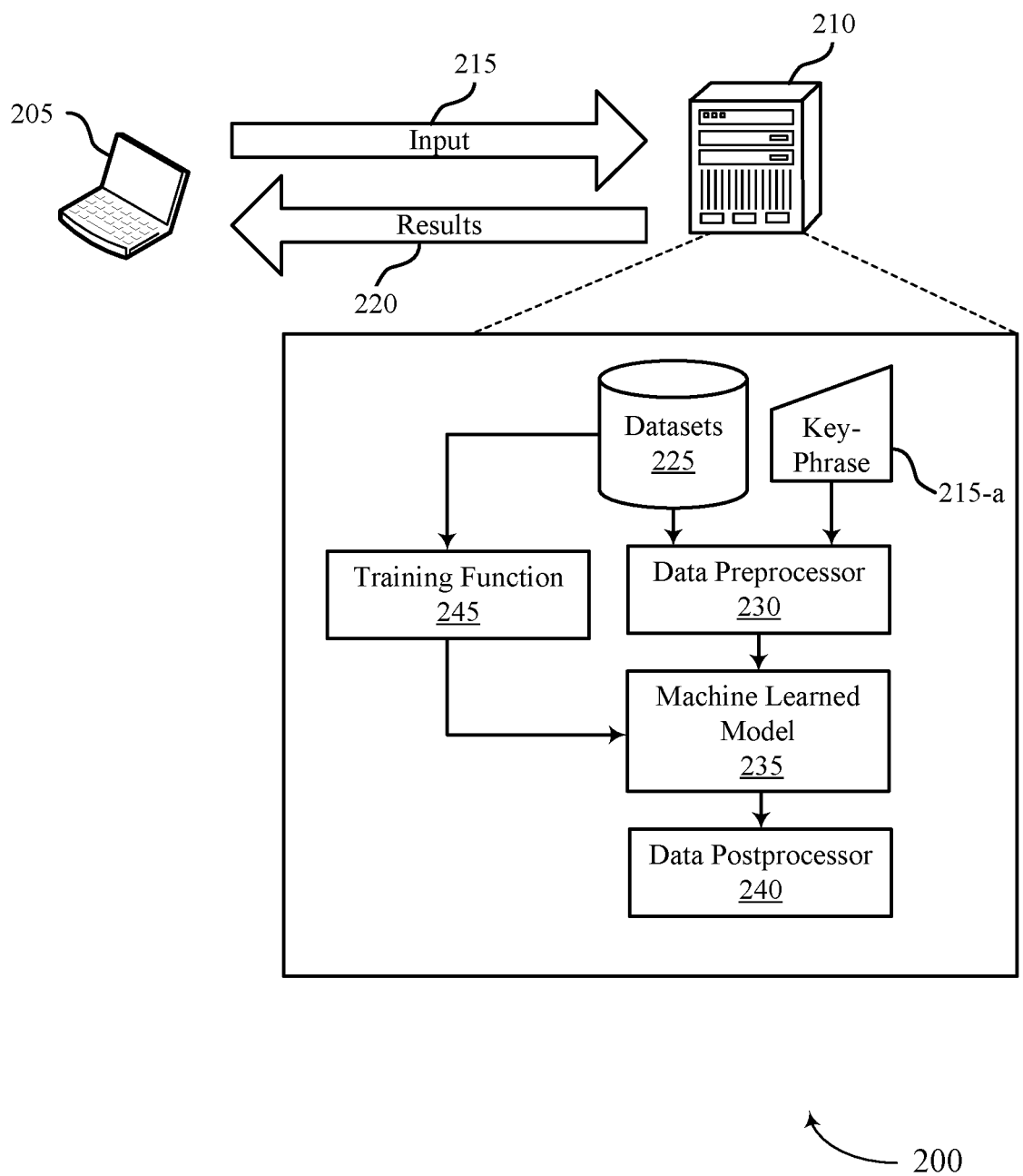
FIG. 2 illustrates an example of a computing system that supports processing forms using artificial intelligence models in accordance with aspects of the present disclosure.

FIG. 2 illustrates an example of a computing system 200 that supports processing forms using artificial intelligence models in accordance with aspects of the present disclosure. The computing system 200 includes a user device 205 and a server 210. The user device 205 may be an example of a device associated with a cloud client 105 or contact 110 of FIG. 1. The server 210 may be examples of aspects of the cloud platform 115 and the datacenter 120 of FIG. 1. For example, the server 210 may represent various devices and components (e.g., application servers, databases, cloud storage, etc.) that support an analytical data system as described herein. The server 210 may support a multi-tenant database system, which may manage various datasets 225 that are associated with specific tenants (e.g., cloud clients 105). In some examples, the datasets 225 may include a set of forms related to the tenant. In some examples, the server 210 may be configured to support a single organization or tenant instead of being configured as a multi-tenant system. The server 210 may also support data retrieval in response to input 215 (e.g., queries) received from user devices, such as user device 205. For example, the server 210 may support retrieving a value from a form based on receiving an input key. The data (e.g., value to a corresponding input key) retrieved in response to an input 215 may be surfaced to a user at the user device 205.

As described, the server 210 may manage various datasets 225 including forms having different formats. The datasets 225 may be associated with specific tenants in the example of a multi-tenant system. For example, a datastore may store a set of datasets 225 that are associated with the tenant corresponding to user device 205. A dataset of the set of datasets 225 may include a fillable form or multiple forms. As depicted herein, the computing system 200 may support a variety of formats of fillable forms including fixed forms and non-fixed forms (e.g., order forms, invoices, etc.). Some computing systems may not be able to automatically extract information from forms having different formats. To support automatic extraction of information from forms, a data preprocessor 230 may identify fields from the forms in a dataset 225. The datasets 225 may store training data including an indication of one or more fields of a form (e.g., a key) corresponding to a related field (e.g., a value) according to relationships between the fields. The training data may be forwarded to the training function 245. According to one or more aspects, the training function 245 may utilize a set of forms (having different formats) to train a machine learned model. In some examples, the training function 245 may receive a set of training forms (e.g., input documents) from the dataset 225 and may extract a set of key-value pairs from the set of training forms or input files (stored in dataset 225). For instance, the training function 245 may train a model to identify a value corresponding to a key in an input document. The training function 245 may utilize labeled data in the set of training forms to identify a value for a corresponding key.

The training function 245 may train the machine learned model 235 (or some other machine learned model) based on inputting a set of input file formats into a transformer-based model. The transformer-based model is described in further detail with reference to FIG. 3. For each word in the set of training forms or input files, an annotation l may indicate whether the word $w_i \in \{0, 1\}$ is a part of the value phrase corresponding to an input key phrase. During the training operation, the training function 245 may train the machine learned model 235 to calculate a binary cross entropy loss between a predicted probability and a ground-truth label using the following equation:

$$\text{loss} = \sum_{i=1}^{M} (l_{w_i} \log p(\text{value}|w_i, \text{key-phrase, document}) + \\ (1 - l_{w_i})(1 - p(\text{value}|l_{w_i}, \text{key-phrase, document}))$$

In the equation, $l_{w_i}$ is defined as an annotation for a word $w_i$ and key-phrase is a key for which the value is calculated. The training function 245 may send the trained model to machine learned model 235. Accordingly, the machine learned model 235 may be trained to identify a value for a particular key included in an input document.

According to one or more aspects of the present disclosure, the forms may be associated with at least one of reports, report types, data objects, data sets, or a combination thereof. In some examples, the computing system 200 may support analytics to extract meaningful information from different types of forms. According to aspects described herein, the data preprocessor 230 may receive one or more inputs 215 (e.g., queries such as natural language queries or database queries). The one or more inputs 215 may also include an input document including a set of input text fields. A user using the user device 205 may upload an input form including a set of input text fields. The input form may be of a fixed format or a non-fixed format. In some instances, each input document may include a set of fields. The data preprocessor 230 may receive the input 215 and may convert the input document into an input understandable by the data preprocessor 230.

In some examples, the data preprocessor 230 may receive an input key phrase 215-a in addition to the input document. The input key phrase 215-a may query a value for a key-value pair that corresponds to one or more of the set of input text fields (e.g., the set of input text fields included in the input document received at the data preprocessor 230). In some examples, the data preprocessor 230 may extract, using an optical character recognition model, a set of character strings and a set of two-dimensional locations of the set of character strings on a layout of the input document. The data preprocessor 230 may then input the extracted set of character strings and the set of two-dimensional locations into a machine learned model (at the machine learned model 235) that is trained (using the training function 245) to compute a probability that a character string of the set of character strings corresponds to the value for the key-value pair corresponding to the input key phrase 215-a. As depicted herein, prior to receiving the input 215, the training function 245 may train a machine learned model based on inputting a set of input file formats into the machine learned model. For instance, the training function 245 may receive a set of training forms including labeled data identifying keys and corresponding values for the keys. Based on the labeled data, the training function 245 may train the machine learned model 245 to identify a value corresponding to a key in an arbitrary document. As one method of identification, the training function 245 may train the machine learned model 245 to compute a probability of multiple potential words or phrases being a value corresponding to a key. The training function 245 may further train the machine learned model 245 to rank the computed probabilities to identify a value for a requested key.

In some examples, the data preprocessor 230 may input the input key phrase 215-a into the machine learned model. The machine learned model 235 (as trained by the training function 245) may identify a set of probabilities for the set of character strings being the value for the key-value pair corresponding to the input key phrase 215-a. In some instances, the data postprocessor 240 may rank the set of probabilities based on a value of each probability in the set of probabilities. The data postprocessor 240 may then identify the value for the key-value pair corresponding to the input key phrase 215-a. In some examples, identifying the value for the key-value pair corresponding to the input key phrase 215-a may be based on ranking the set of probabilities. For instance, the data postprocessor 240 may identify the value corresponding to the input key phrase 215-a as the value having a highest computed probability. For example, the machine learned model 235 may rank probabilities of a value for the key-value pair corresponding to the input key phrase 215-a and the data postprocessor 240 may identify a result (e.g., having a top ranked probability). Upon identifying the value corresponding to the requested input key phrase 215-a, the data postprocessor 240 may transmit the identified value (in results 220) to the user device 205. As such, the result 220 including the identified value corresponding to the input key phrase 215-a may be returned to the user. The concepts and techniques described with reference to FIG. 2 are further described with respect to the following figures.

Figure 3:
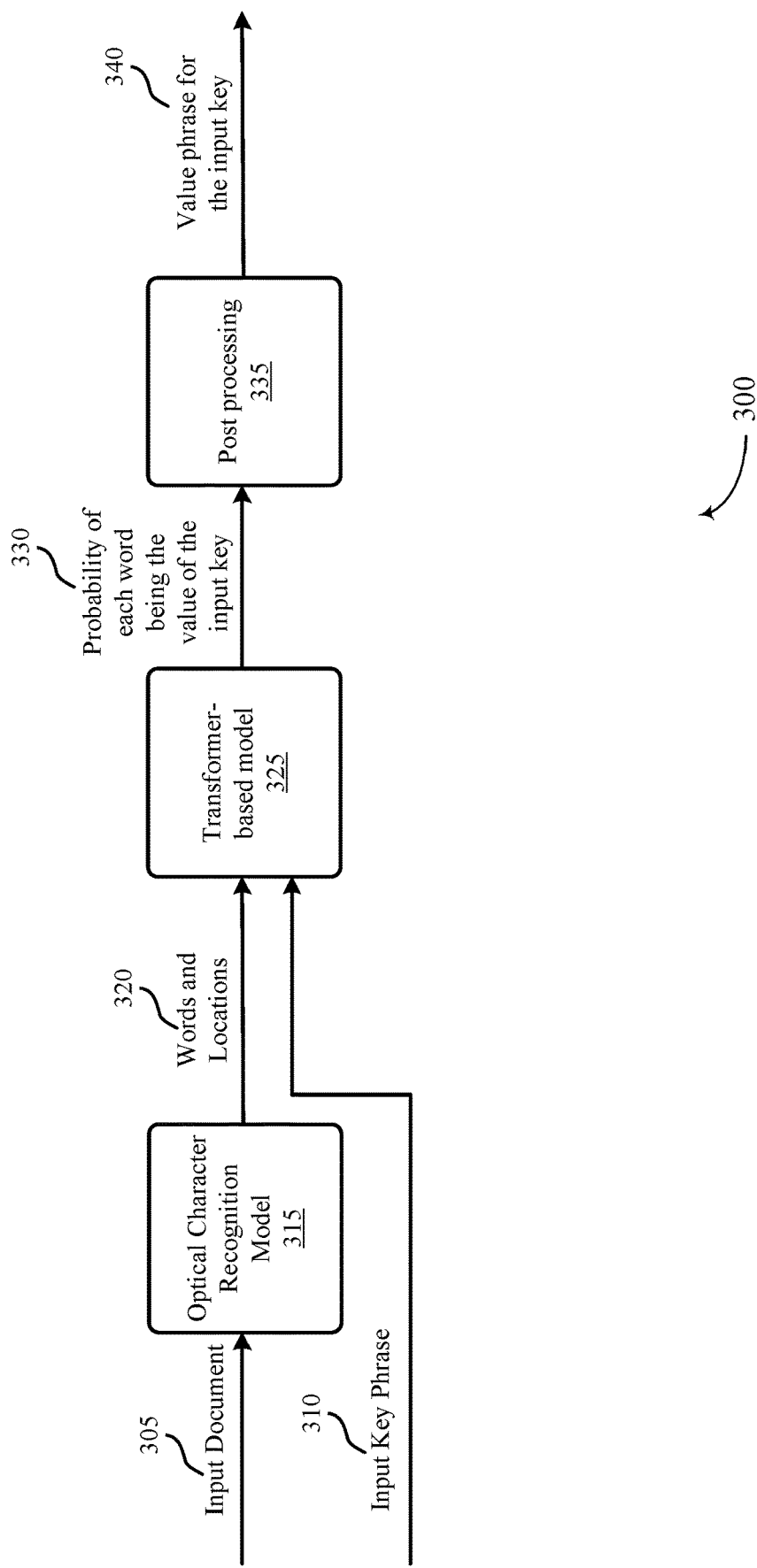
FIG. 3 illustrates an example of a process flow that supports processing forms using artificial intelligence models in accordance with aspects of the present disclosure.

FIG. 3 illustrates an example of a process flow 300 that supports processing forms using artificial intelligence models in accordance with aspects of the present disclosure. The process flow diagram 300 may be implemented in conjunction with a user device and a server (e.g., an application server or a combination of computing devices as described herein). The user device may be an example of the user device 205 as described with respect to FIG. 2, and the server may be an example of the server 210 as described with respect to FIG. 2. Although one user device is depicted in the example of FIG. 3, it may be understood that the process flow 300 may be implemented using multiple user devices. The server may represent a set of computing components, data storage components, and the like, that support a database system as described herein. In some examples, the database system may be configured as a multi-tenant database system as described herein.

In some examples, the operations illustrated in the process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

The aspects depicted herein provide a method for extracting key-value pairs from arbitrary non-fixed forms based on requests from users. The process flow 300 may be applicable to arbitrary types of non-fixed forms and users may be flexible to extract key-value pairs of interest. As described with reference to FIG. 3, the process flow 300 utilizes a transformer-based machine learned model (e.g., machine learned model 235) to infer the value for arbitrary keys specified by users. In some examples, the transformer-based machine learned model may be a deep learning model that adopts the mechanism of differentially weighing significance of different portions of an input data. Transformer-based machine learned models may be used in the field of natural language processing. While the process flow 300 is described with reference to a transformer-based machine learned model, it is to be understood that other machine learned models may be used for extracting key-value pairs from arbitrary non-fixed forms based on requests from users.

At 305, a user may provide an input document including a set of input text fields. The input document may be stored in a database, server, cloud storage, or any other form of data storage as described with reference to FIGS. 1 and 2. The input document may be an example of a fixed form or a non-fixed form. The form may include a set of text fields and a set of values corresponding to the text fields. The text fields and values may be considered as key-value pairs such that a field may be considered a key and the text, numbers, or data in that field may be considered the value corresponding to the key. A specific example of a form with key-value pairs is provided with reference to FIG. 4.

At 310, the user may input an input key phrase querying a value for a key-value pair that corresponds to one or more of the set of input text fields. For example, the user may upload a form and may query a value corresponding to a key included in the form. In some instances, a user may upload a form F including keys K1, K2 and K3. Each key in the form may have a value associated with it. In one example, the form may include value V1 corresponding to key K1, value V2 corresponding to key K2 and value V3 corresponding to key K3. The user may query the value for input key phrase K2. In some examples, the form may have already been input or uploaded (e.g., previously, or by another user, etc.), and the user at 310 may provide the input key phrase for a querying operation.

At 315, an optical character recognition model may extract from the input document a set of character strings and a set of two-dimensional locations of the set of character strings on a layout of the input document. With reference to the prior example form, the optical character recognition model may extract the words K1, K2, K3, V1, V2, and V3. Although each value is depicted as a single word, it is to be understood that a single value phrase may include multiple words. In the case where a single value phrase includes multiple words, the optical character recognition model may identify each word separately. The optical character recognition model may process the input document (e.g., an image of a form) to detect and recognize optical character recognition words [w1, w2, ..., wM] and their corresponding locations [b1, b2, ..., bM] in the input document. In some examples, the locations may be x-y coordinates in the input document. Referring to form F, the optical character recognition model may detect and recognize optical character recognition words [K1, K2, K3, V1, V2, V3] and their corresponding locations [x1y1, x2y2, x3y3, x4y4, x5y5, x6y6]. Although an optical character recognition model is provide as an example, it is to be understood that any model capable of extracting text, values, or information from an image or text file may be used at 315.

At 320, the set of character strings and the set of two-dimensional locations of the set of character strings may be input into a machine learned model such as a transformer-based model. As described herein, the transformer-based model may be an example of a machine learned model that is trained to compute a probability that a character string of the set of character strings corresponds to the value for the key-value pair corresponding to the input key phrase. That is, the machine learned model may compute a probability for each character string, where the probability indicates how likely that character string is the value that corresponds to the key in the form that corresponds to the key phrase input by the user.

The transformer-based model may receive the words generated by the optical character recognition along with their corresponding locations and the requested key phrase as inputs and may generate the probability of each word being the value corresponding to the requested key or key phrase. In some examples, a server or other computing device executing the transformer-based model may tokenize the input key phrase into words, [kw1, kw2, ..., kwN], where k may be a constant. In some examples, [kw1, kw2, ..., kwN] and [w1+b1, w2+b2, ..., wN+bN] may be inputted to the transformer-based model. As depicted herein, w1 included in the optical character recognition words [w1, w2, ..., wM] and b1 included in their corresponding locations [b1, b2, ..., bM] correspond to the word generated with the optical character recognition model and its locations in the input document.

At 325, a server or other computing device may use the transformer-based model to compute a probability that a character string of the set of character strings corresponds to the value for the key-value pair corresponding to the input key phrase. In some examples, the input key phrase querying a value for a key-value pair may be associated with location information. In such cases where the input phrase has no location information, the transformer-based model may use a dummy location [0,0,0,0] for each key word to fit the transformer's input parameter. The transformer-based model may first generate a feature representation for each input key word and each optical character recognized word. In some examples, the feature representation may use a set of techniques that allows a system to perform feature detection or classification from raw data. The feature representation may include an array with a certain length (N) that represents the words (each input key word and each optical character recognized word) in a way that the transformer-based model can process. In the example of form F, the transformer-based model may generate feature representation for the input key word and the optical character recognition words [K1, K2, K3, V1, V2, V3] may be [fkw1', fkw2', fkw3', fkw4', fkw5', fkw6'].

In some examples, a server or other computing device may generate a first set of feature representations for a set of keywords included in the set of input text fields and a second set of feature representations for the extracted set of character strings. For example, the server may generate the optical character recognized word's feature representation as [fkw1', fkw2', ..., fkwN']. The optical character recognized word's representation [fkw1', fkw2', ..., fkwN'] may further be projected by a fully connected layer leading to [fw1, fw2, ..., fwM], where M is a total number of optical character recognition words in the input document (e.g., form F). For instance, the transformer-based model may project the feature representation array [fkw1', fkw2', ..., fkwN'] to a fully connected layer generating an array [fw1, fw2, ..., fwM].

In some examples, the server may generate a unified feature representation for the input key phrase on the first set of feature representations and the second set of feature representations In some instances, the server may generate a unified representation $f_{key\text{-}phrase}$ for the input key phrase by first averaging the features of all the key words and then projecting the averaged representation to another space by a fully connected layer. In some examples, the fully connected layer may be a normalization layer that receives an array as an input and provides a normalized term as an output. In the example depicted herein, the fully connected layer may receive an array including a normalized representation of the keywords and may generate a unified term (or representation) for the keywords in the input document. In some instances, the fully connected layers may be examples of encoder layers of the transformer-based model.

The transformer-based model, as part of an inference procedure, may then determine a probability of each extracted word being the value for the input key phrase. For example, the transformer-based model may identify a set of probabilities for the set of character strings being the value for the key-value pair corresponding to the input key phrase. In some examples, the transformer-based model may apply a dot product between the unified feature representation for the input key phrase and each feature representation of the second set of feature representations. In some examples, the probability that the character string of the set of character strings corresponds to the value for the key-value pair corresponding to the input key phrase is computed based on applying the dot product.

In some examples, the transformer-based model may obtain a matching score between the input key phrase and each of the extracted word. The matching score may be obtained by applying dot product between the representation of key phrase and each of the extracted word's feature representation. The transformer-based model may obtain the matching probability by applying the sigmoid function to the matching score using the following equation:

$$p(value|w_i, key\text{-}phrase, document) = sigmoid(f_{key\text{-}phrase}, f_{w_i})$$

In the equation, the probability that a word $w_i$ is a value corresponding to the input key phrase in the document is given by a sigmoid function to a dot product between the unified representation $f_{key\text{-}phrase}$ and the feature representation word $w_i$ (shown as $f_{w_i}$).

In some examples, the transformer-based model may identify a set of probabilities for the set of character strings being the value for the key-value pair corresponding to the input key phrase. In the example of form F, the transformer-based model may determine that the value V1 has a probability p1 of being the value corresponding to the input key phrase K2. Similarly, the transformer-based model may determine the value V2 has a probability p2 of being the value corresponding to the input key phrase K2 and that the value V3 has a probability p3 of being the value corresponding to the input key phrase K2. The transformer-based model may rank the set of probabilities based on a value of each probability in the set of probabilities. For example, the set of probabilities may be ranked in decreasing order, such that character strings having the highest probability of being a match are listed first followed by character strings have lower probabilities. In the example of form F, the transformer-based model may rank the probabilities as p2, p1, and p3. Such a ranking may indicate that the value V2 has the highest probability of being a value of the input key phrase K2.

In some examples, the transformer-based model may determine that the input key phrase does not match a key that corresponds to one or more of the set of input text fields. In the example of form F, the input key phrase may include a key K5 which does not match the keys K1, K2 and K3 included in the document. In such cases, the transformer-based model may generate or otherwise identify a dummy key corresponding to the input key phrase based on determining that the input key phrase does not match the key. In some examples, the transformer-based model may identify an approximate match between the input key phrase (K5) and the keys (K1, K2 and K3) included in the document. For instance, the transformer-based model may match with K2. In such cases, the transformer-based model may return V2 as the value for the input key phrase K5. In some examples, identifying the value for the key-value pair is based on identifying the dummy key. The transformer-based model may also determine that the input key phrase is associated with an empty value field. In some examples, the server may identify a dummy value corresponding to the input key phrase based on determining that the input key phrase is associated with the empty value field. In some cases, the identified value corresponding to the input key phrase may include the dummy value.

At 335, the server may perform a post processing operation to identify the value for the key-value pair corresponding to the input key phrase based on inputting the extracted set of character strings and the set of two-dimensional locations into the transformed-based model. For example, the server may identify the value for the key-value pair corresponding to the input key phrase in accordance with the probabilities ranked by the transformer-based model. In some instances, identifying the value for the key-value pair corresponding to the input key phrase is based on ranking the set of probabilities.

In some examples, the server may receive the probabilities of each value and may generate a value phrase proposal. Values from the input document may contain multiple words. For example, the value V2 in form F may include words v21, v22, and v23 (e.g., the value for the key K2 may include several words and/or numbers), and as the post processing, the server may generate proposals by grouping nearby extracted words if their horizontal and/or vertical distance is within some threshold. For instance, if the words v21, v22, and v23 are within a threshold vicinity of each other, then the server groups them as a single value phrase. Additionally or alternatively, the server may generate a probability of each proposal being included in the value for the input key phrase. For example, the server may determine whether the probability of each proposal is the maximum of the extracted words' probabilities within this group. In the example of form F, the server may determine a combined probability of words v21, v22, and v23. If the probability of words v21, v22, and v23 is higher than the probability of remaining groups, the server may then generate the value for the input key phrase (e.g., pick the proposal with the highest probability of this value). If the probability is lower than a threshold, the server may refrain from responding. Thus, the server may group one or more character strings into a value phrase based on an output of the machine learned model and the set of two-dimensional locations of the set of character strings. As depicted herein, identifying the value for the key-value pair may be based on grouping the one or more character strings.

At 340, the server may transmit the identified value corresponding to the input key phrase. For example, the server may determine a value for the key-value pair corresponding to the input key phrase (received at 310) and may transmit the value to the user device that input the input key phrase.

FIG. 4 illustrates an example of an input document 400 that supports processing forms using artificial intelligence models in accordance with aspects of the present disclosure.

A user may submit the input document 400 to a system or application via a user interface. In some examples, the input document 400 may be input into the system by another user or already stored in a database or similar storage system. The input document 400 may be a form having a fixed format or a non-fixed format. A user may submit an input key phrase querying a value for a key-value pair. The user may be associated with a tenant of a multi-tenant database which has been using the cloud platform for data management. There may be several data stores of data and metadata associated with the tenant which may be used to train a machine learned model. The trained machine learned model may be used to process the query and generate a response.

The input document 400 may include multiple key-value pairs. For example, the input document 400 may include a key "bill to" and a corresponding value "John Smith 2 Court Square New York, NY 12210." As another example, the input document 400 includes a key 404 ("invoice #") and a corresponding value 406 ("US-001"). As depicted with reference to FIG. 4, the input document 400 may include a value without any key associated with it. For instance, the value 402 include "East Repair Inc. 1912 Harvest Lane New York, NY 12210." However, the input document 400 does not include a key corresponding to the value 402.

Once the user submits the input key phrase, the user interface receiving the input key phrase may send the input key phrase to a database server or some similar computing device or architecture running a machine learned model component. In some examples, the user interface may send a natural language query to a database server with a machine learned model component. For example, the natural language query may be processed by the database server (e.g., device 210 described with reference to FIG. 2) and the database server may identify the input key phrase which may correspond to the natural language query. In some examples, the server may extract, using an optical character recognition model, a set of character strings and a set of two-dimensional locations of the set of character strings on a layout of the input document 400. For example, the server may extract the words or phrases "bill," "to," "ship," "to," "invoice #," "US-001" and so on. The server may generate an array of words corresponding to the input document 400 and an array or their corresponding locations. For example, a reference location may be established for the input document 400 (e.g., the lower left-hand corner), and the locations (e.g., with respect to an X, Y coordinate system or any other coordinate system) of the words "bill", "to," "ship," "to," etc. may be determined with respect to the reference location. The server may then determine the value corresponding to the input key phrase based on one or more probability values computed by a machine learned model, as described in more detail with reference to FIG. 3.

In the example of FIG. 4, the user may submit an input key phrase as "invoice #." In this example, the user is querying the value in the form associated with the field "invoice #." Using the optical character recognition model and the machine learned model, as described herein, the server may determine that the value 406 "US-001" is the corresponding value to the input key phrase. In some examples, the input key phrase may not match any key in the input document 400. For instance, instead of inputting "invoice #" the user may input "invoice number." The server may determine that the phrase "invoice number" is a closest match to the key 404 "invoice #." The technique for matching the input key phrase to a key included in the input document 400 is described in further details in FIG. 3. Upon matching, the server may return the value 406 "US-001" as the value of the input key phrase "invoice number."

In some examples, the server may determine that the input key phrase is associated with an empty value field. The server may identify a dummy value corresponding to the input key phrase based on determining that the input key phrase is associated with the empty value field. In such instances, the server may return the dummy value in response to an input key phrase that is associated with an empty value.

Figure 5:
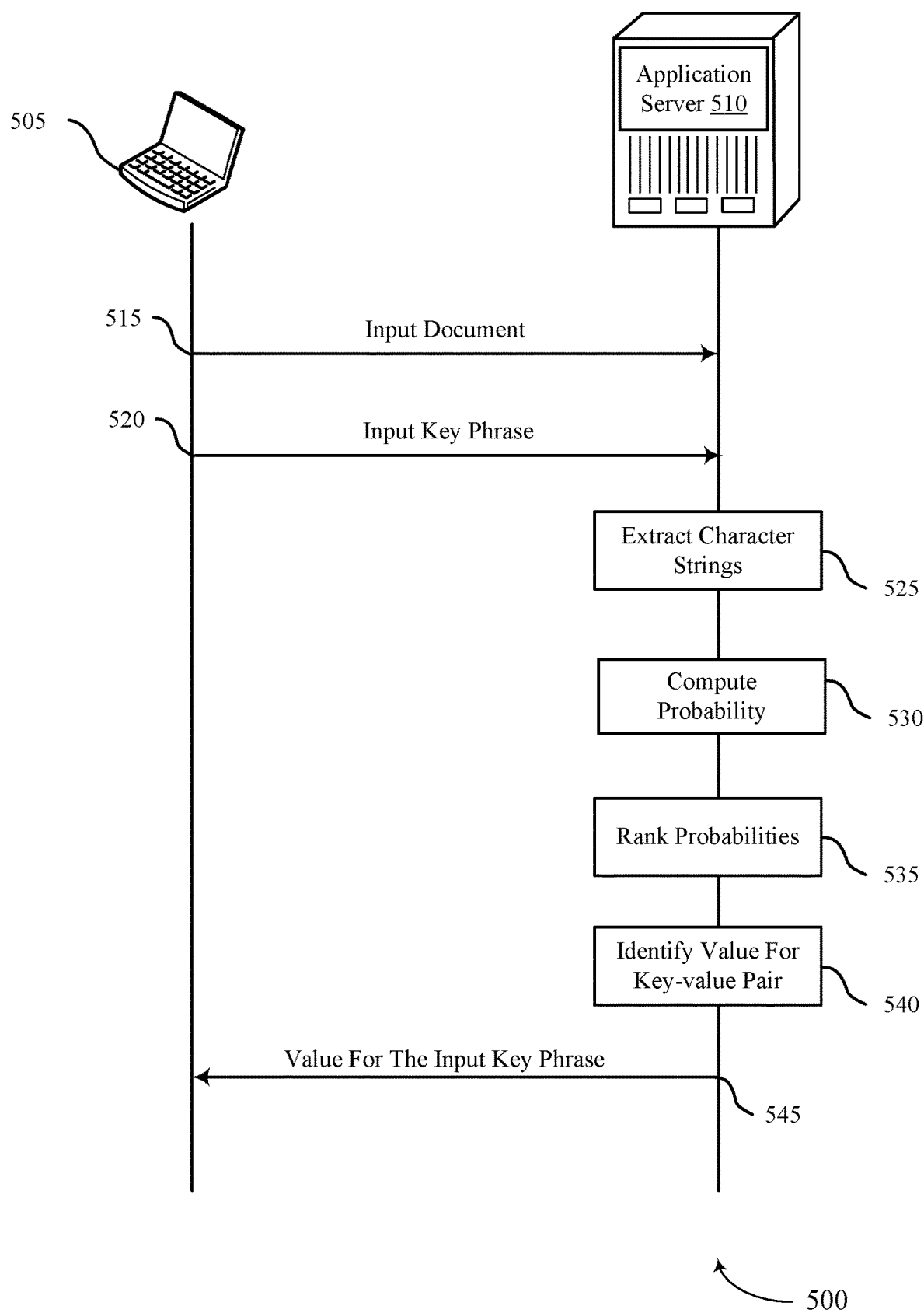
FIG. 5 illustrates an example of a process flow that supports processing forms using artificial intelligence models in accordance with aspects of the present disclosure.

FIG. 5 illustrates an example of a process flow 500 that supports processing forms using artificial intelligence models in accordance with aspects of the present disclosure. The process flow diagram 500 includes a user device 505 and a server 510. The user device 505 may be an example of the user device 205 as described with respect to FIG. 2, and the server 510 may be an example of the server 210 as described with respect to FIG. 2. Although one user device 505 is depicted in the example of FIG. 5, it may be understood that the process flow 500 may include multiple user devices 505. The server may represent a set of computing components, data storage components, and the like, as described herein, and the processing may occur across on or more multiple devices. In some examples, the server 510 may support a multi-tenant database system as described herein. The process illustrated in FIG. 5 may be performed for various tenants of the multiple tenant system.

In some examples, the operations illustrated in the process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 515, the server 510 may receive an input document including a set of input text fields. In some examples, the input document may include a fixed form, a non-fixed form, or both. The server 510 may receive the input document through an upload or submission process via a user interface.

At 520, the server 510 may receive an input key phrase querying a value for a key-value pair that corresponds to one or more of the set of input text fields. The server 510 may receive the input key phrase via the user interface. The user interface used to submit the input document may be the same or different than the user interface used to submit the input key phrase.

At 525, the server 510 may extract, using an optical character recognition model, a set of character strings and a set of two-dimensional locations of the set of character strings on a layout of the input document. At 530, the server 510 may compute a probability that a character string of the set of character strings corresponds to the value for the key-value pair corresponding to the input key phrase. In some examples, the server 510 may input the extracted set of character strings and the set of two-dimensional locations into a machine learned model that is trained to compute the probability that a character string of the set of character strings corresponds to the value for the key-value pair corresponding to the input key phrase. In some cases, the server 510 may input the input key phrase into the machine learned model. The server 510 may then identify a set of probabilities for the set of character strings being the value for the key-value pair corresponding to the input key phrase.

At 535, the server 510 may rank the set of probabilities based on a value of each probability in the set of probabilities. At 540, the server 510 may identify the value for the key-value pair corresponding to the input key phrase based on inputting the extracted set of character strings and the set of two-dimensional locations into the machine learned model. In some examples, identifying the value for the key-value pair corresponding to the input key phrase may be based on ranking the set of probabilities. Additionally or alternatively, the server 510 may group one or more character strings into a value phrase based on an output of the machine learned model and the set of two-dimensional locations of the set of character strings. In some examples, identifying the value for the key-value pair is based on grouping the one or more character strings. At 545, the server 510 may transmit the identified value corresponding to the input key phrase to the user device 505.

Figure 6:
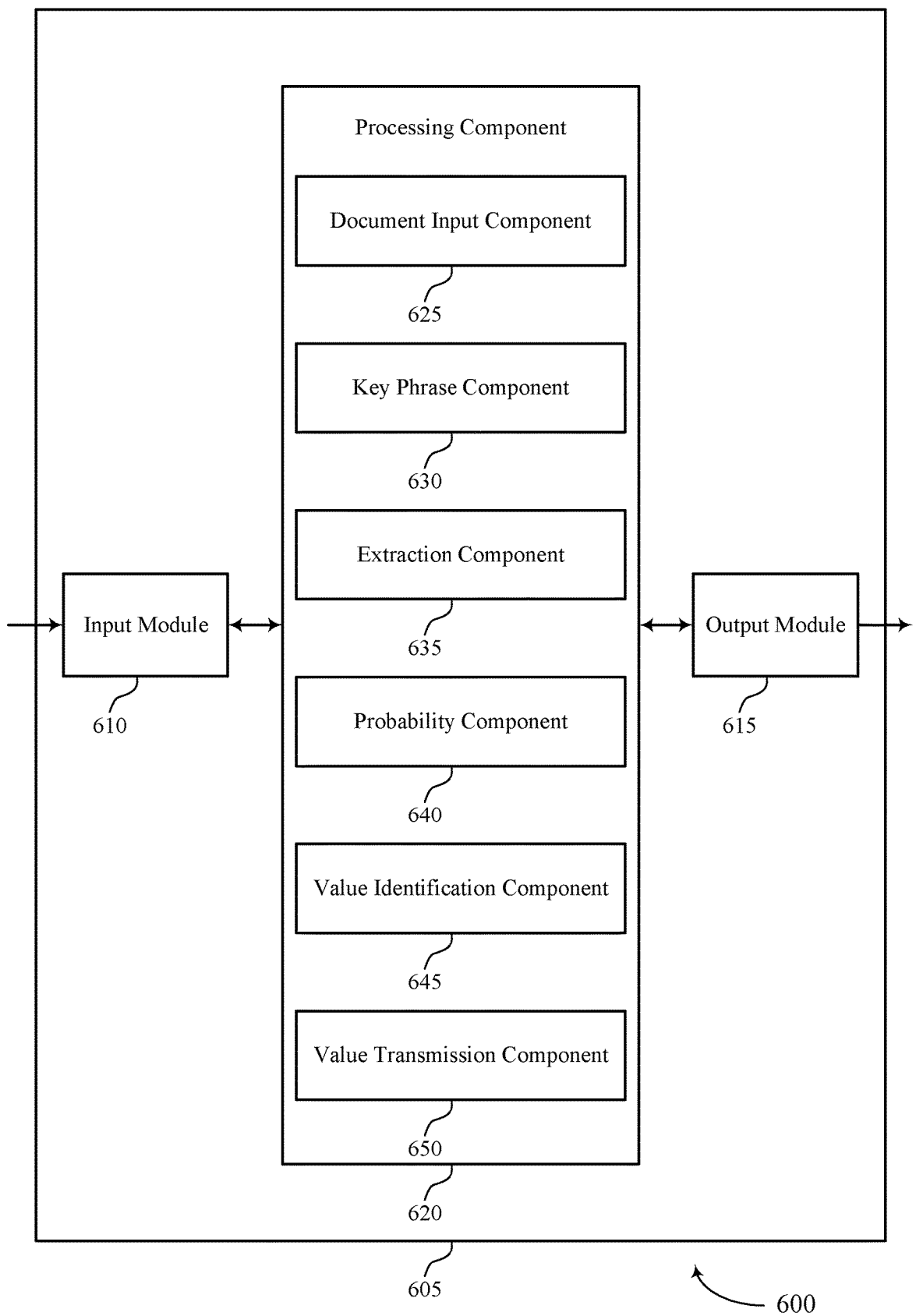
FIG. 6 shows a block diagram of an apparatus that supports processing forms using artificial intelligence models in accordance with aspects of the present disclosure.

FIG. 6 shows a block diagram 600 of a device 605 that supports processing forms using artificial intelligence models in accordance with aspects of the present disclosure. The device 605 may include an input module 610, an output module 615, and a processing component 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the processing component 620 to support processing forms using artificial intelligence models. In some cases, the input module 610 may be a component of an I/O controller 810 as described with reference to FIG. 8.

The output module 615 may manage output signals for the device 605. For example, the output module 615 may receive signals from other components of the device 605, such as the processing component 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the processing component 620 may include a document input component 625, a key phrase component 630, an extraction component 635, a probability component 640, a value identification component 645, a value transmission component 650, or any combination thereof. In some examples, the processing component 620, or various components thereof, may be configured to perform various operations (e.g., receiving, monitoring, transmitting) using or otherwise in cooperation with the input module 610, the output module 615, or both. For example, the processing component 620 may receive information from the input module 610, send information to the output module 615, or be integrated in combination with the input module 610, the output module 615, or both to receive information, transmit information, or perform various other operations as described herein.

The processing component 620 may support form processing at a server in accordance with examples as disclosed herein. The document input component 625 may be configured as or otherwise support a means for receiving an input document including a plurality of input text fields. The key phrase component 630 may be configured as or otherwise support a means for receiving an input key phrase querying a value for a key-value pair that corresponds to one or more of the plurality of input text fields. The extraction component 635 may be configured as or otherwise support a means for extracting, using an optical character recognition model, a set of character strings and a set of two-dimensional locations of the set of character strings on a layout of the input document. The probability component 640 may be configured as or otherwise support a means for inputting the extracted set of character strings and the set of two-dimensional locations into a machine learned model that is trained to compute a probability that a character string of the set of character strings corresponds to the value for the key-value pair corresponding to the input key phrase. The value identification component 645 may be configured as or otherwise support a means for identifying the value for the key-value pair corresponding to the input key phrase based at least in part on the inputting. The value transmission component 650 may be configured as or otherwise support a means for transmitting the identified value corresponding to the input key phrase.

Figure 7:
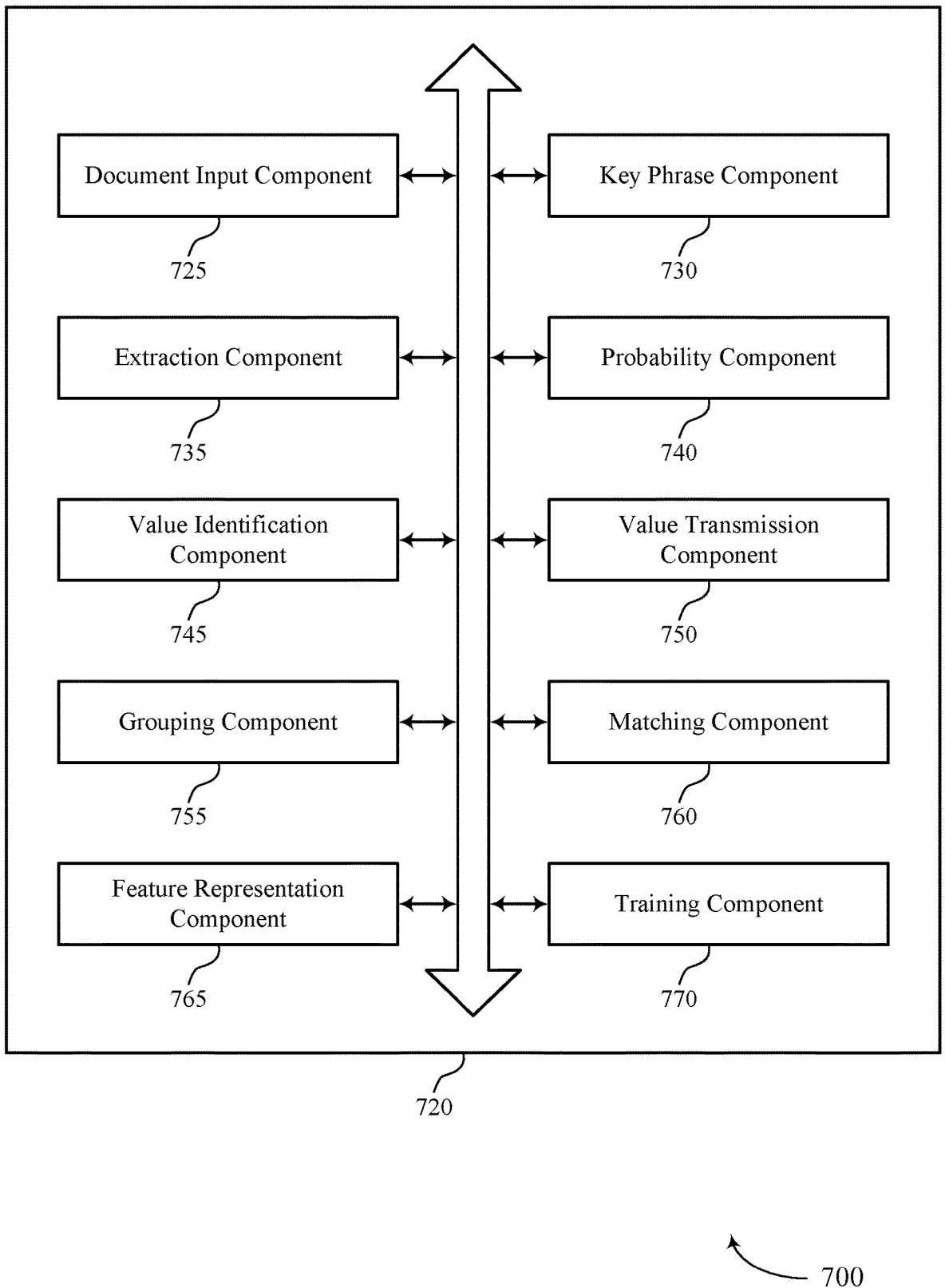
FIG. 7 shows a block diagram of a processing component that supports processing forms using artificial intelligence models in accordance with aspects of the present disclosure.

FIG. 7 shows a block diagram 700 of a processing component 720 that supports processing forms using artificial intelligence models in accordance with aspects of the present disclosure. The processing component 720 may be an example of aspects of a processing component or a processing component 620, or both, as described herein. The processing component 720, or various components thereof, may be an example of means for performing various aspects of processing forms using artificial intelligence models as described herein. For example, the processing component 720 may include a document input component 725, a key phrase component 730, an extraction component 735, a probability component 740, a value identification component 745, a value transmission component 750, a grouping component 755, a matching component 760, a feature representation component 765, a training component 770, or any combination thereof. Each of these components may communicate, directly or indirectly, with one another (e.g., via one or more buses).

The processing component 720 may support form processing at a server in accordance with examples as disclosed herein. The document input component 725 may be configured as or otherwise support a means for receiving an input document including a plurality of input text fields. The key phrase component 730 may be configured as or otherwise support a means for receiving an input key phrase querying a value for a key-value pair that corresponds to one or more of the plurality of input text fields. The extraction component 735 may be configured as or otherwise support a means for extracting, using an optical character recognition model, a set of character strings and a set of two-dimensional locations of the set of character strings on a layout of the input document. The probability component 740 may be configured as or otherwise support a means for inputting the extracted set of character strings and the set of two-dimensional locations into a machine learned model that is trained to compute a probability that a character string of the set of character strings corresponds to the value for the key-value pair corresponding to the input key phrase. The value identification component 745 may be configured as or otherwise support a means for identifying the value for the key-value pair corresponding to the input key phrase based at least in part on the inputting. The value transmission component 750 may be configured as or otherwise support a means for transmitting the identified value corresponding to the input key phrase.

In some examples, the key phrase component 730 may be configured as or otherwise support a means for inputting the input key phrase into the machine learned model. In some examples, the probability component 740 may be configured as or otherwise support a means for identifying a set of probabilities for the set of character strings being the value for the key-value pair corresponding to the input key phrase.

In some examples, the probability component 740 may be configured as or otherwise support a means for ranking the set of probabilities based at least in part on a value of each probability in the set of probabilities, wherein identifying the value for the key-value pair corresponding to the input key phrase is based at least in part on ranking the set of probabilities.

In some examples, the grouping component 755 may be configured as or otherwise support a means for grouping one or more character strings into a value phrase based at least in part on an output of the machine learned model and the set of two-dimensional locations of the set of character strings, wherein identifying the value for the key-value pair is based at least in part on grouping the one or more character strings.

In some examples, the matching component 760 may be configured as or otherwise support a means for determining that the input key phrase does not match a key that corresponds to one or more of the plurality of input text fields. In some examples, the value identification component 745 may be configured as or otherwise support a means for identifying a dummy key corresponding to the input key phrase based at least in part on determining that the input key phrase does not match the key, wherein identifying the value for the key-value pair is based at least in part on identifying the dummy key.

In some examples, the value identification component 745 may be configured as or otherwise support a means for determining that the input key phrase is associated with an empty value field. In some examples, the value identification component 745 may be configured as or otherwise support a means for identifying a dummy value corresponding to the input key phrase based at least in part on determining that the input key phrase is associated with the empty value field, wherein the identified value corresponding to the input key phrase comprises the dummy value.

In some examples, the feature representation component 765 may be configured as or otherwise support a means for generating a first set of feature representations for a set of keywords included in the plurality of input text fields and a second set of feature representations for the extracted set of character strings. In some examples, the feature representation component 765 may be configured as or otherwise support a means for generating an unified feature representation for the input key phrase based at least in part on the first set of feature representations and the second set of feature representations, wherein identifying the value for the key-value pair corresponding to the input key phrase is based at least in part on the unified feature representation.

In some examples, the feature representation component 765 may be configured as or otherwise support a means for applying a dot product between the unified feature representation for the input key phrase and each feature representation of the second set of feature representations, wherein the probability that the character string of the set of character strings corresponds to the value for the key-value pair corresponding to the input key phrase is computed based at least in part on applying the dot product.

In some examples, the training component 770 may be configured as or otherwise support a means for training the machine learned model based at least in part on inputting a plurality of input file formats into the machine learned model. In some examples, the input document comprises a fixed form, a non-fixed form, or both. In some examples, the machine learned model comprises a transformer-based machine learned model.

Figure 8:
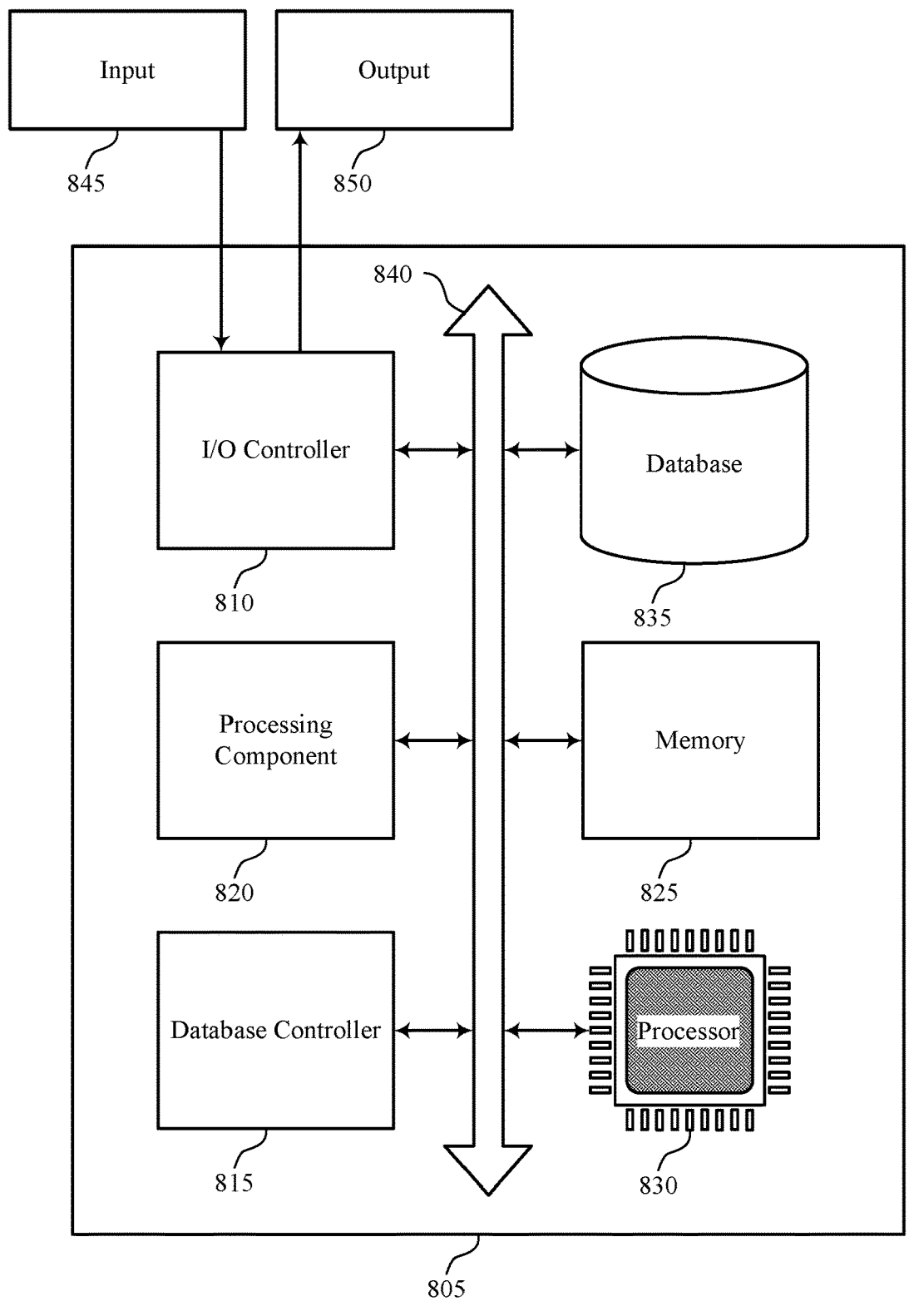
FIG. 8 shows a diagram of a system including a device that supports processing forms using artificial intelligence models in accordance with aspects of the present disclosure.

FIG. 8 shows a diagram of a system 800 including a device 805 that supports processing forms using artificial intelligence models in accordance with aspects of the present disclosure. The device 805 may be an example of or include the components of a device 605 as described herein. The device 805 may include components for bi-directional data communications including components for transmitting and receiving communications, such as a processing component 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting processing forms using artificial intelligence models).

The processing component 820 may support form processing at a server in accordance with examples as disclosed herein. For example, the processing component 820 may be configured as or otherwise support a means for receiving an input document including a plurality of input text fields. The processing component 820 may be configured as or otherwise support a means for receiving an input key phrase querying a value for a key-value pair that corresponds to one or more of the plurality of input text fields. The processing component 820 may be configured as or otherwise support a means for extracting, using an optical character recognition model, a set of character strings and a set of two-dimensional locations of the set of character strings on a layout of the input document. The processing component 820 may be configured as or otherwise support a means for inputting the extracted set of character strings and the set of two-dimensional locations into a machine learned model that is trained to compute a probability that a character string of the set of character strings corresponds to the value for the key-value pair corresponding to the input key phrase. The processing component 820 may be configured as or otherwise support a means for identifying the value for the key-value pair corresponding to the input key phrase based at least in part on the inputting. The processing component 820 may be configured as or otherwise support a means for transmitting the identified value corresponding to the input key phrase.

By including or configuring the processing component 820 in accordance with examples as described herein, the device 805 may support techniques for handling different types of forms, dummy values, and keys without values, and improved user experience related to processing documents without a predefined template.

Figure 9:
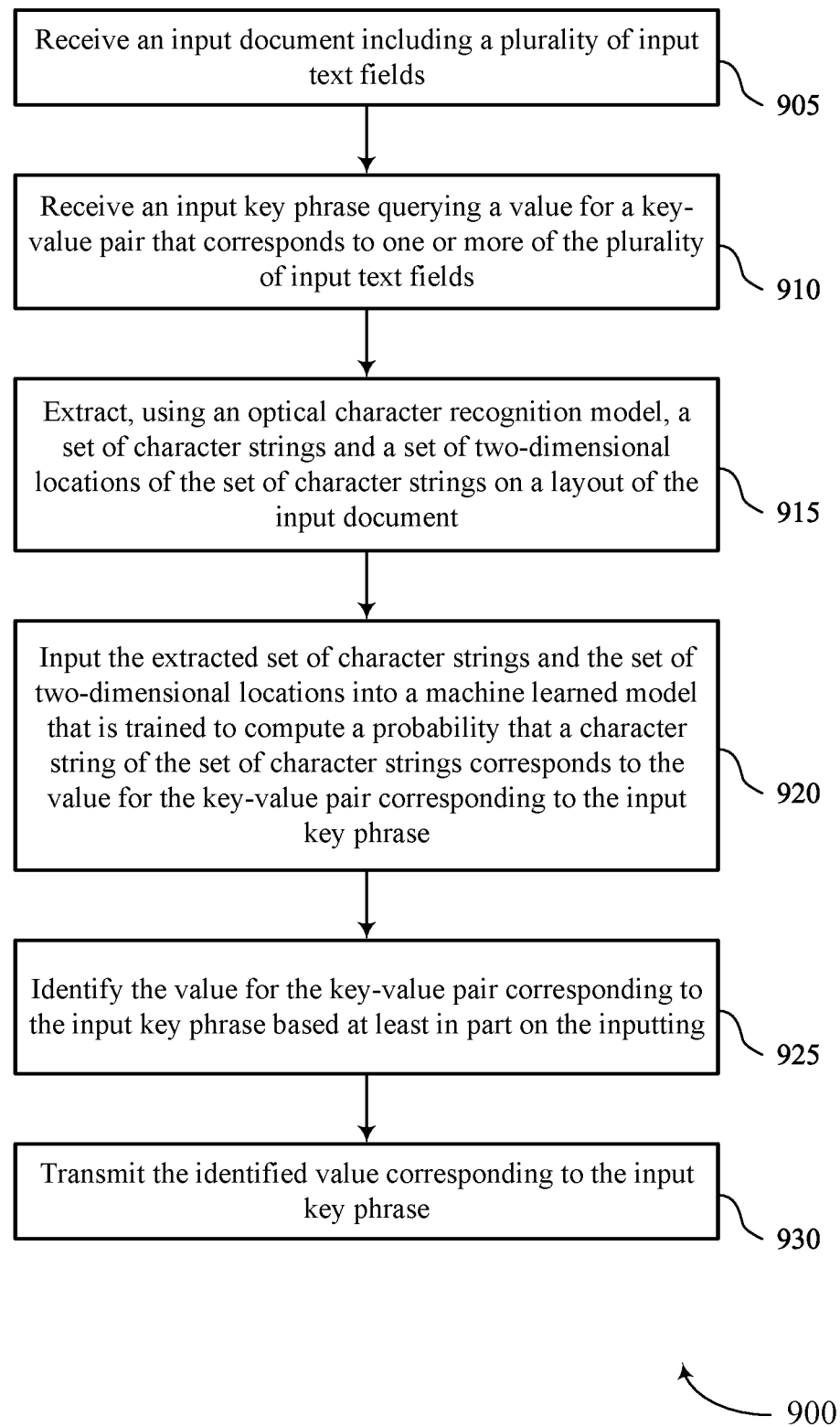
FIGS. 9 through 11 show flowcharts illustrating methods that support processing forms using artificial intelligence models in accordance with aspects of the present disclosure.

FIG. 9 shows a flowchart illustrating a method 900 that supports processing forms using artificial intelligence models in accordance with aspects of the present disclosure. The operations of the method 900 may be implemented by an application server or its components as described herein. For example, the operations of the method 900 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 905, the method may include receiving an input document including a plurality of input text fields. The operations of 905 may be performed in accordance with examples as disclosed herein. In some examples, aspects of the operations of 905 may be performed by a document input component 725 as described with reference to FIG. 7.

At 910, the method may include receiving an input key phrase querying a value for a key-value pair that corresponds to one or more of the plurality of input text fields. The operations of 910 may be performed in accordance with examples as disclosed herein. In some examples, aspects of the operations of 910 may be performed by a key phrase component 730 as described with reference to FIG. 7.

At 915, the method may include extracting, using an optical character recognition model, a set of character strings and a set of two-dimensional locations of the set of character strings on a layout of the input document. The operations of 915 may be performed in accordance with examples as disclosed herein. In some examples, aspects of the operations of 915 may be performed by an extraction component 735 as described with reference to FIG. 7.

At 920, the method may include inputting the extracted set of character strings and the set of two-dimensional locations into a machine learned model that is trained to compute a probability that a character string of the set of character strings corresponds to the value for the key-value pair corresponding to the input key phrase. The operations of 920 may be performed in accordance with examples as disclosed herein. In some examples, aspects of the operations of 920 may be performed by a probability component 740 as described with reference to FIG. 7.

At 925, the method may include identifying the value for the key-value pair corresponding to the input key phrase based at least in part on the inputting. The operations of 925 may be performed in accordance with examples as disclosed herein. In some examples, aspects of the operations of 925 may be performed by a value identification component 745 as described with reference to FIG. 7.

At 930, the method may include transmitting the identified value corresponding to the input key phrase. The operations of 930 may be performed in accordance with examples as disclosed herein. In some examples, aspects of the operations of 930 may be performed by a value transmission component 750 as described with reference to FIG. 7.

Figure 10:
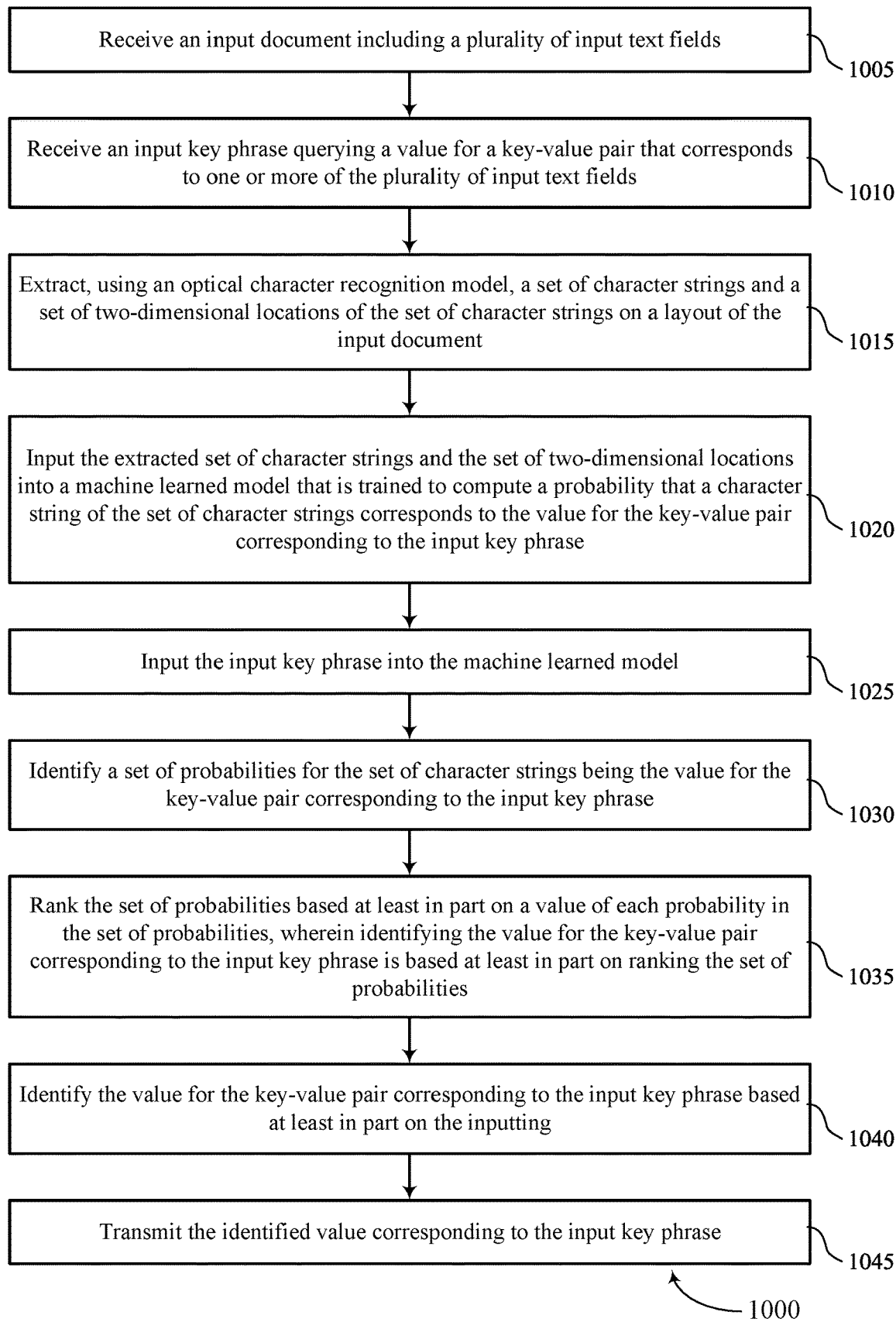

FIG. 10 shows a flowchart illustrating a method 1000 that supports processing forms using artificial intelligence models in accordance with aspects of the present disclosure. The operations of the method 1000 may be implemented by an application server or its components as described herein. For example, the operations of the method 1000 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1005, the method may include receiving an input document including a plurality of input text fields. The operations of 1005 may be performed in accordance with examples as disclosed herein. In some examples, aspects of the operations of 1005 may be performed by a document input component 725 as described with reference to FIG. 7.

At 1010, the method may include receiving an input key phrase querying a value for a key-value pair that corresponds to one or more of the plurality of input text fields.

The operations of 1010 may be performed in accordance with examples as disclosed herein. In some examples, aspects of the operations of 1010 may be performed by a key phrase component 730 as described with reference to FIG. 7.

At 1015, the method may include extracting, using an optical character recognition model, a set of character strings and a set of two-dimensional locations of the set of character strings on a layout of the input document. The operations of 1015 may be performed in accordance with examples as disclosed herein. In some examples, aspects of the operations of 1015 may be performed by an extraction component 735 as described with reference to FIG. 7.

At 1020, the method may include inputting the extracted set of character strings and the set of two-dimensional locations into a machine learned model that is trained to compute a probability that a character string of the set of character strings corresponds to the value for the key-value pair corresponding to the input key phrase. The operations of 1020 may be performed in accordance with examples as disclosed herein. In some examples, aspects of the operations of 1020 may be performed by a probability component 740 as described with reference to FIG. 7.

At 1025, the method may include inputting the input key phrase into the machine learned model. The operations of 1025 may be performed in accordance with examples as disclosed herein. In some examples, aspects of the operations of 1025 may be performed by a key phrase component 730 as described with reference to FIG. 7.

At 1030, the method may include identifying a set of probabilities for the set of character strings being the value for the key-value pair corresponding to the input key phrase. The operations of 1030 may be performed in accordance with examples as disclosed herein. In some examples, aspects of the operations of 1030 may be performed by a probability component 740 as described with reference to FIG. 7.

At 1035, the method may include ranking the set of probabilities based at least in part on a value of each probability in the set of probabilities, wherein identifying the value for the key-value pair corresponding to the input key phrase is based at least in part on ranking the set of probabilities. The operations of 1035 may be performed in accordance with examples as disclosed herein. In some examples, aspects of the operations of 1035 may be performed by a probability component 740 as described with reference to FIG. 7.

At 1040, the method may include identifying the value for the key-value pair corresponding to the input key phrase based at least in part on the inputting. The operations of 1040 may be performed in accordance with examples as disclosed herein. In some examples, aspects of the operations of 1040 may be performed by a value identification component 745 as described with reference to FIG. 7.

At 1045, the method may include transmitting the identified value corresponding to the input key phrase. The operations of 1045 may be performed in accordance with examples as disclosed herein. In some examples, aspects of the operations of 1045 may be performed by a value transmission component 750 as described with reference to FIG. 7.

Figure 11:
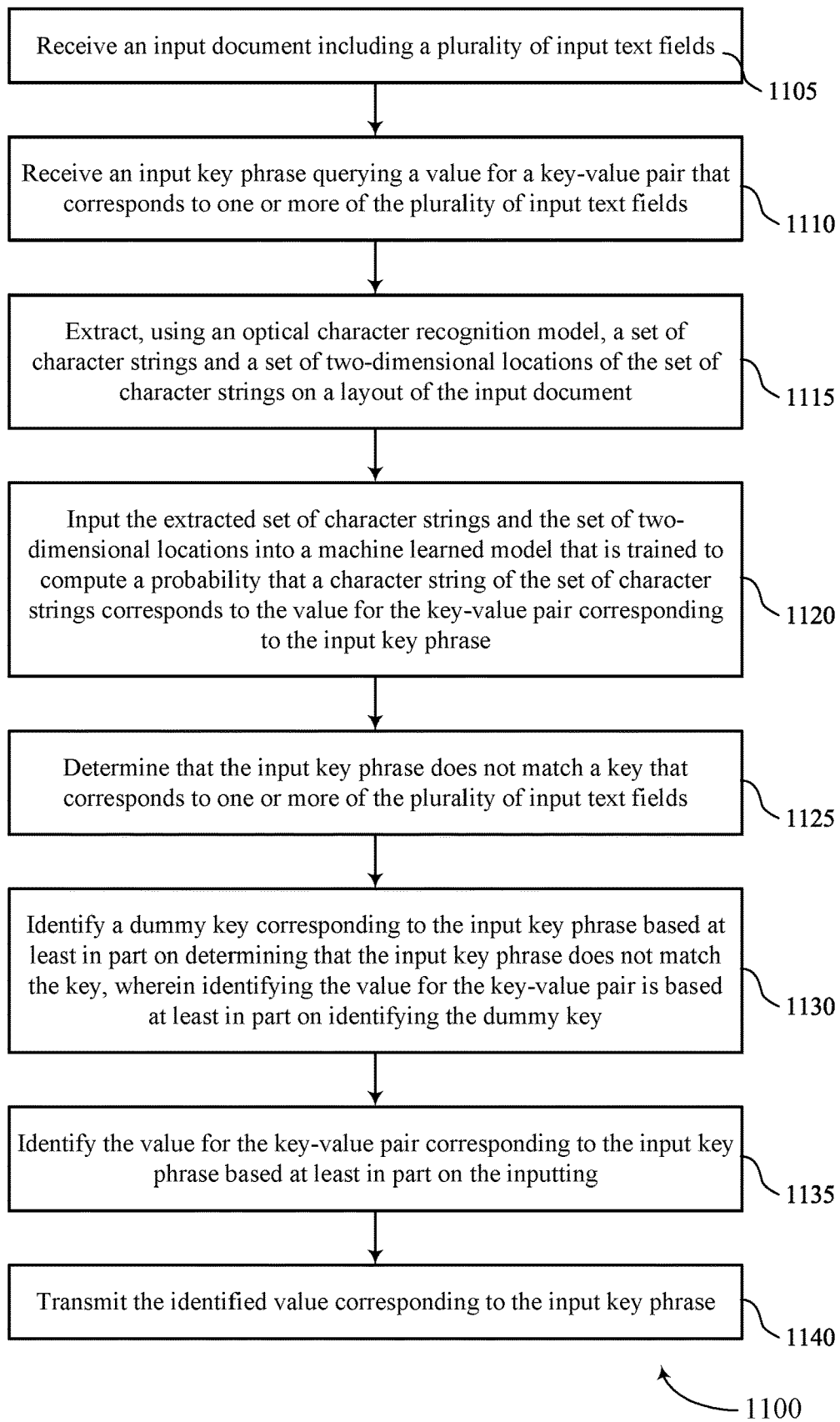

FIG. 11 shows a flowchart illustrating a method 1100 that supports processing forms using artificial intelligence models in accordance with aspects of the present disclosure. The operations of the method 1100 may be implemented by an application server or its components as described herein. For example, the operations of the method 1100 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1105, the method may include receiving an input document including a plurality of input text fields. The operations of 1105 may be performed in accordance with examples as disclosed herein. In some examples, aspects of the operations of 1105 may be performed by a document input component 725 as described with reference to FIG. 7.

At 1110, the method may include receiving an input key phrase querying a value for a key-value pair that corresponds to one or more of the plurality of input text fields. The operations of 1110 may be performed in accordance with examples as disclosed herein. In some examples, aspects of the operations of 1110 may be performed by a key phrase component 730 as described with reference to FIG. 7.

At 1115, the method may include extracting, using an optical character recognition model, a set of character strings and a set of two-dimensional locations of the set of character strings on a layout of the input document. The operations of 1115 may be performed in accordance with examples as disclosed herein. In some examples, aspects of the operations of 1115 may be performed by an extraction component 735 as described with reference to FIG. 7.

At 1120, the method may include inputting the extracted set of character strings and the set of two-dimensional locations into a machine learned model that is trained to compute a probability that a character string of the set of character strings corresponds to the value for the key-value pair corresponding to the input key phrase. The operations of 1120 may be performed in accordance with examples as disclosed herein. In some examples, aspects of the operations of 1120 may be performed by a probability component 740 as described with reference to FIG. 7.

At 1125, the method may include determining that the input key phrase does not match a key that corresponds to one or more of the plurality of input text fields. The operations of 1125 may be performed in accordance with examples as disclosed herein. In some examples, aspects of the operations of 1125 may be performed by a matching component 760 as described with reference to FIG. 7.

At 1130, the method may include identifying a dummy key corresponding to the input key phrase based at least in part on determining that the input key phrase does not match the key, wherein identifying the value for the key-value pair is based at least in part on identifying the dummy key. The operations of 1130 may be performed in accordance with examples as disclosed herein. In some examples, aspects of the operations of 1130 may be performed by a value identification component 745 as described with reference to FIG. 7.

At 1135, the method may include identifying the value for the key-value pair corresponding to the input key phrase based at least in part on the inputting. The operations of 1135 may be performed in accordance with examples as disclosed herein. In some examples, aspects of the operations of 1135 may be performed by a value identification component 745 as described with reference to FIG. 7.

At 1140, the method may include transmitting the identified value corresponding to the input key phrase. The operations of 1140 may be performed in accordance with examples as disclosed herein. In some examples, aspects of the operations of 1140 may be performed by a value transmission component 750 as described with reference to FIG. 7.

A method for form processing at a server is described. The method may include receiving an input document including a plurality of input text fields, receiving an input key phrase querying a value for a key-value pair that corresponds to one or more of the plurality of input text fields, extracting, using an optical character recognition model, a set of character strings and a set of two-dimensional locations of the set of character strings on a layout of the input document, inputting the extracted set of character strings and the set of two-dimensional locations into a machine learned model that is trained to compute a probability that a character string of the set of character strings corresponds to the value for the key-value pair corresponding to the input key phrase, identifying the value for the key-value pair corresponding to the input key phrase based at least in part on the inputting, and transmitting the identified value corresponding to the input key phrase.

An apparatus for form processing at a server is described. The apparatus may include a processor, memory coupled with the processor, and instructions stored in the memory. The instructions may be executable by the processor to cause the apparatus to receive an input document including a plurality of input text fields, receive an input key phrase querying a value for a key-value pair that corresponds to one or more of the plurality of input text fields, extract, using an optical character recognition model, a set of character strings and a set of two-dimensional locations of the set of character strings on a layout of the input document, input the extracted set of character strings and the set of two-dimensional locations into a machine learned model that is trained to compute a probability that a character string of the set of character strings corresponds to the value for the key-value pair corresponding to the input key phrase, identify the value for the key-value pair corresponding to the input key phrase based at least in part on the inputting, and transmit the identified value corresponding to the input key phrase.

Another apparatus for form processing at a server is described. The apparatus may include means for receiving an input document including a plurality of input text fields, means for receiving an input key phrase querying a value for a key-value pair that corresponds to one or more of the plurality of input text fields, means for extracting, using an optical character recognition model, a set of character strings and a set of two-dimensional locations of the set of character strings on a layout of the input document, means for inputting the extracted set of character strings and the set of two-dimensional locations into a machine learned model that is trained to compute a probability that a character string of the set of character strings corresponds to the value for the key-value pair corresponding to the input key phrase, means for identifying the value for the key-value pair corresponding to the input key phrase based at least in part on the inputting, and means for transmitting the identified value corresponding to the input key phrase.

A non-transitory computer-readable medium storing code for form processing at a server is described. The code may include instructions executable by a processor to receive an input document including a plurality of input text fields, receive an input key phrase querying a value for a key-value pair that corresponds to one or more of the plurality of input text fields, extract, using an optical character recognition model, a set of character strings and a set of two-dimensional locations of the set of character strings on a layout of the input document, input the extracted set of character strings and the set of two-dimensional locations into a machine learned model that is trained to compute a probability that a character string of the set of character strings corresponds to the value for the key-value pair corresponding to the input key phrase, identify the value for the key-value pair corresponding to the input key phrase based at least in part on the inputting, and transmit the identified value corresponding to the input key phrase.

Some examples of the method, apparatuses, and non-transitory computer-readable medium described herein may further include operations, features, means, or instructions for inputting the input key phrase into the machine learned model and identifying a set of probabilities for the set of character strings being the value for the key-value pair corresponding to the input key phrase.

Some examples of the method, apparatuses, and non-transitory computer-readable medium described herein may further include operations, features, means, or instructions for ranking the set of probabilities based at least in part on a value of each probability in the set of probabilities, wherein identifying the value for the key-value pair corresponding to the input key phrase may be based at least in part on ranking the set of probabilities.

Some examples of the method, apparatuses, and non-transitory computer-readable medium described herein may further include operations, features, means, or instructions for grouping one or more character strings into a value phrase based at least in part on an output of the machine learned model and the set of two-dimensional locations of the set of character strings, wherein identifying the value for the key-value pair may be based at least in part on grouping the one or more character strings.

Some examples of the method, apparatuses, and non-transitory computer-readable medium described herein may further include operations, features, means, or instructions for determining that the input key phrase does not match a key that corresponds to one or more of the plurality of input text fields and identifying a dummy key corresponding to the input key phrase based at least in part on determining that the input key phrase does not match the key, wherein identifying the value for the key-value pair may be based at least in part on identifying the dummy key.

Some examples of the method, apparatuses, and non-transitory computer-readable medium described herein may further include operations, features, means, or instructions for determining that the input key phrase may be associated with an empty value field and identifying a dummy value corresponding to the input key phrase based at least in part on determining that the input key phrase may be associated with the empty value field, wherein the identified value corresponding to the input key phrase comprises the dummy value.

Some examples of the method, apparatuses, and non-transitory computer-readable medium described herein may further include operations, features, means, or instructions for generating a first set of feature representations for a set of keywords included in the plurality of input text fields and a second set of feature representations for the extracted set of character strings and generating an unified feature representation for the input key phrase based at least in part on the first set of feature representations and the second set of feature representations, wherein identifying the value for the key-value pair corresponding to the input key phrase may be based at least in part on the unified feature representation.

Some examples of the method, apparatuses, and non-transitory computer-readable medium described herein may further include operations, features, means, or instructions for applying a dot product between the unified feature representation for the input key phrase and each feature representation of the second set of feature representations, wherein the probability that the character string of the set of character strings corresponds to the value for the key-value pair corresponding to the input key phrase may be computed based at least in part on applying the dot product.

Some examples of the method, apparatuses, and non-transitory computer-readable medium described herein may further include operations, features, means, or instructions for training the machine learned model based at least in part on inputting a plurality of input file formats into the machine learned model.

In some examples of the method, apparatuses, and non-transitory computer-readable medium described herein, the input document comprises a fixed form, a non-fixed form, or both. In some examples of the method, apparatuses, and non-transitory computer-readable medium described herein, the machine learned model comprises a transformer-based machine learned model.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for form processing, comprising:
receiving an input document including a plurality of input text fields;
receiving an input key phrase querying a value for a key-value pair that corresponds to one or more of the plurality of input text fields;
extracting, using an optical character recognition model, a set of character strings and a set of two-dimensional locations of the set of character strings on a layout of the input document;
inputting the extracted set of character strings, the set of two-dimensional locations, and the input key phrase into a machine learned model that is trained to compute a set of probabilities for the set of character strings corresponding to the value for the key-value pair corresponding to the input key phrase;
identifying that a character string of the set of character strings corresponds to the value for the key-value pair corresponding to the input key phrase based at least in part on the inputting and on a respective probability for the character string being the value corresponding to the input key phrase being greater than one or more other respective probabilities of one or more other character strings of the set of character strings; and
transmitting the identified value corresponding to the input key phrase.

2. The method of claim 1, further comprising:
identifying the set of probabilities for the set of character strings being the value for the key-value pair corresponding to the input key phrase based at least in part on the input key phrase being inputted into the machine learned model.

3. The method of claim 2, further comprising:
ranking the set of probabilities based at least in part on a value of each probability in the set of probabilities, wherein identifying the value for the key-value pair corresponding to the input key phrase is based at least in part on ranking the set of probabilities.

4. The method of claim 1, further comprising:
grouping one or more character strings into a value phrase based at least in part on an output of the machine learned model and the set of two-dimensional locations of the set of character strings, wherein identifying the value for the key-value pair is based at least in part on grouping the one or more character strings.

5. The method of claim 1, further comprising:
determining that the input key phrase does not match a key that corresponds to one or more of the plurality of input text fields; and
identifying a dummy key corresponding to the input key phrase based at least in part on determining that the input key phrase does not match the key, wherein identifying the value for the key-value pair is based at least in part on identifying the dummy key.

6. The method of claim 1, further comprising:
determining that the input key phrase is associated with an empty value field; and
identifying a dummy value corresponding to the input key phrase based at least in part on determining that the input key phrase is associated with the empty value field, wherein the identified value corresponding to the input key phrase comprises the dummy value.

7. The method of claim 1, further comprising:
generating a first set of feature representations for a set of keywords included in the plurality of input text fields and a second set of feature representations for the extracted set of character strings; and
generating an unified feature representation for the input key phrase based at least in part on the first set of feature representations and the second set of feature representations, wherein identifying the value for the key-value pair corresponding to the input key phrase is based at least in part on the unified feature representation.

8. The method of claim 7, further comprising:
applying a dot product between the unified feature representation for the input key phrase and each feature representation of the second set of feature representations, wherein the respective probability that the character string of the set of character strings corresponds to the value for the key-value pair corresponding to the input key phrase is computed based at least in part on applying the dot product.

9. The method of claim 1, further comprising:
training the machine learned model based at least in part on inputting a plurality of input file formats into the machine learned model.

10. The method of claim 1, wherein the input document comprises a fixed form, a non-fixed form, or both.

11. The method of claim 1, wherein the machine learned model comprises a transformer-based machine learned model.

12. An apparatus for form processing, comprising:
one or more processors;
one or more memories coupled with the one or more processors; and
instructions stored in the one or more memories and executable by the one or more processors to cause the apparatus to:
receive an input document including a plurality of input text fields;
receive an input key phrase querying a value for a key-value pair that corresponds to one or more of the plurality of input text fields;
extract, using an optical character recognition model, a set of character strings and a set of two-dimensional locations of the set of character strings on a layout of the input document;
input the extracted set of character strings, the set of two-dimensional locations, and the input key phrase into a machine learned model that is trained to compute a set of probabilities for the set of character strings corresponding to the value for the key-value pair corresponding to the input key phrase;
identify that a character string of the set of character strings corresponds to the value for the key-value pair corresponding to the input key phrase based at least in part on the inputting and on a respective probability for the character string being the value corresponding to the input key phrase being greater than one or more other respective probabilities of one or more other character strings of the set of character strings; and
transmit the identified value corresponding to the input key phrase.

13. The apparatus of claim 12, wherein the instructions are further executable by the one or more processors to cause the apparatus to:
identify the set of probabilities for the set of character strings being the value for the key-value pair corresponding to the input key phrase based at least in part on the input key phrase being inputted into the machine learned model.

14. The apparatus of claim 13, wherein the instructions are further executable by the one or more processors to cause the apparatus to:

rank the set of probabilities based at least in part on a value of each probability in the set of probabilities, wherein identifying the value for the key-value pair corresponding to the input key phrase is based at least in part on ranking the set of probabilities.

15. The apparatus of claim 12, wherein the instructions are further executable by the one or more processors to cause the apparatus to:

group one or more character strings into a value phrase based at least in part on an output of the machine learned model and the set of two-dimensional locations of the set of character strings, wherein identifying the value for the key-value pair is based at least in part on grouping the one or more character strings.

16. The apparatus of claim 12, wherein the instructions are further executable by the one or more processors to cause the apparatus to:

determine that the input key phrase does not match a key that corresponds to one or more of the plurality of input text fields; and identify a dummy key corresponding to the input key phrase based at least in part on determining that the input key phrase does not match the key, wherein identifying the value for the key-value pair is based at least in part on identifying the dummy key.

17. The apparatus of claim 12, wherein the instructions are further executable by the one or more processors to cause the apparatus to:

determine that the input key phrase is associated with an empty value field; and identify a dummy value corresponding to the input key phrase based at least in part on determining that the input key phrase is associated with the empty value field, wherein the identified value corresponding to the input key phrase comprises the dummy value.

18. The apparatus of claim 12, wherein the instructions are further executable by the one or more processors to cause the apparatus to:

generate a first set of feature representations for a set of keywords included in the plurality of input text fields and a second set of feature representations for the extracted set of character strings; and generate an unified feature representation for the input key phrase based at least in part on the first set of feature representations and the second set of feature representations, wherein identifying the value for the key-value pair corresponding to the input key phrase is based at least in part on the unified feature representation.

19. The apparatus of claim 18, wherein the instructions are further executable by the one or more processors to cause the apparatus to:

apply a dot product between the unified feature representation for the input key phrase and each feature representation of the second set of feature representations, wherein the respective probability that the character string of the set of character strings corresponds to the value for the key-value pair corresponding to the input key phrase is computed based at least in part on applying the dot product.

20. A non-transitory computer-readable medium storing code for form processing, the code comprising instructions executable by one or more processors to:

receive an input document including a plurality of input text fields;

receive an input key phrase querying a value for a key-value pair that corresponds to one or more of the plurality of input text fields;

extract, using an optical character recognition model, a set of character strings and a set of two-dimensional locations of the set of character strings on a layout of the input document;

input the extracted set of character strings, the set of two-dimensional locations, and the input key phrase into a machine learned model that is trained to compute a set of probabilities for the set of character strings corresponding to the value for the key-value pair corresponding to the input key phrase;

identify that a character string of the set of character strings corresponds to the value for the key-value pair corresponding to the input key phrase based at least in part on the inputting and on a respective probability for the character string being the value corresponding to the input key phrase being greater than one or more other respective probabilities of one or more other character strings of the set of character strings; and transmit the identified value corresponding to the input key phrase.

* * * * *